United States Patent
Minamisawa

(10) Patent No.: US 11,243,409 B2
(45) Date of Patent: Feb. 8, 2022

(54) OPTICAL UNIT WITH SHAKE CORRECTION FUNCTION

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 232 days.

(21) Appl. No.: 16/252,718

(22) Filed: Jan. 21, 2019

(65) Prior Publication Data

US 2019/0235267 A1    Aug. 1, 2019

(30) Foreign Application Priority Data

Jan. 29, 2018 (JP) .............................. JP2018-012984

(51) Int. Cl.
G02B 27/64 (2006.01)
G02B 7/08 (2021.01)
G02B 7/02 (2021.01)

(52) U.S. Cl.
CPC ............. *G02B 27/646* (2013.01); *G02B 7/08* (2013.01); *G02B 7/021* (2013.01)

(58) Field of Classification Search
CPC ........ G02B 27/646; G02B 7/08; G02B 7/021; G02B 7/022; G02B 7/04; H04N 5/2254;
(Continued)

(56) References Cited

U.S. PATENT DOCUMENTS

2004/0120046 A1*  6/2004  Shirie ................ G02B 27/0018
                                                              359/611
2010/0061712 A1*  3/2010  Akabane .................. G02B 7/08
                                                              396/439
(Continued)

FOREIGN PATENT DOCUMENTS

JP   2009294393    12/2009
JP   2016061958    4/2016
(Continued)

OTHER PUBLICATIONS

"Office Action of Taiwan Counterpart Application", dated May 25, 2020, with English translation thereof, pp. 1-18.
(Continued)

*Primary Examiner* — Stephone B Allen
*Assistant Examiner* — Gabriel A Sanz
(74) *Attorney, Agent, or Firm* — JCIPRNET

(57) ABSTRACT

An optical unit with a shake correction function include a fixed body, a movable body having an optical element, a swing support mechanism swingably supporting the movable body, and a shake correction drive mechanism structured to swing the movable body. The movable body includes a first abutting part abutted with a first stopper part of the fixed body at a time of a maximum swing, and a second abutting part abutted with a second stopper part of the fixed body at a time of a movement in an optical axis direction. The second stopper part and the second abutting part are separated so as not to contact with each other when the movable body is swung, and a separated distance along the optical axis direction between the second stopper part and the second abutting part is smaller than a separated distance between the first abutting part and the fixed body.

7 Claims, 14 Drawing Sheets

(58) Field of Classification Search
CPC ............ H04N 5/2257; H04N 5/23248; H04N 5/23287
See application file for complete search history.

(56) References Cited

U.S. PATENT DOCUMENTS

2011/0097062 A1* 4/2011 Tsuruta ................ G02B 27/646
396/55
2011/0262121 A1* 10/2011 Yanagisawa ........... G03B 17/02
396/55
2017/0176766 A1* 6/2017 Sue ........................ G02B 27/64
2017/0343832 A1 11/2017 Yeo

FOREIGN PATENT DOCUMENTS

| TW | 200632502 | 9/2006 |
|----|-----------|--------|
| TW | I418913 | 12/2013 |
| TW | 201405236 | 2/2014 |

OTHER PUBLICATIONS

"Office Action of China Counterpart Application", dated Nov. 26, 2020, with English translation thereof, pp. 1-14.

* cited by examiner

OPTICAL UNIT WITH SHAKE CORRECTION FUNCTION

CROSS REFERENCE TO RELATED APPLICATION

The present application claims priority under 35 U.S.C. § 119 to Japanese Application No. 2018-012984 filed on Jan. 29, 2018, and the entire content of which is incorporated herein by reference.

TECHNICAL FIELD

The present invention relates to an optical unit with a shake correction function structured to perform a shake correction of an optical module which is mounted on a portable terminal with a camera or the like.

BACKGROUND

In an optical unit used in an optical device such as an imaging device which is mounted on a portable terminal, a drive recorder, an unmanned helicopter or the like, in order to restrain disturbance of a photographed image due to a shake, a function has been developed by which an optical module is swung to cancel a shake and correct the shake. In the shake correction function, a structure is adopted that an optical module having an optical element is swingably supported with respect to a fixed body which is a housing of an optical device, and the optical module is swung by a shake correction drive mechanism depending on a shake.

The shake correction drive mechanism includes a magnet and a coil, and the shake correction drive mechanism is structured so that an electro-magnetic force is acted on the optical module for driving by supplying an electric current to the coil in a magnetic field of the magnet.

For example, in Japanese Patent Laid-Open No. 2009-294393 (Patent Literature 1), a structure is proposed that an optical module is swingably supported by a pivot provided on a rear side in an optical axis direction of the optical module and a shake is corrected by swinging the optical module (movable body) with the pivot as a center.

On the other hand, a structure has been also proposed in which an optical module is swingably supported by a gimbal mechanism and, in Japanese Patent Laid-Open No. 2016-61958 (Patent Literature 2), a gimbal mechanism is disclosed in which a plate-shaped spring provided with support points in two directions perpendicular to an optical axis direction is used.

In this type of optical unit with a shake correction function, when a movable body provided with an optical module which is swung depending on a shake is excessively swung, deformation is occurred in the gimbal mechanism and the like, and a malfunction may occur in a later operation.

In order to prevent this problem, in Patent Literature 2, a stopper for restricting a swing allowable range of the movable body is provided. In this case, a protruded part is provided at an upper end of a holder which holds a coil so as to protrude to an upper side and a cushion member is provided on a rear face of a cover of a fixed body which covers the holder, and the cushion member is disposed to an upper side of the protruded part of the holder and thereby, when the holder as a movable body is swung, the protruded part of the holder is abutted with the cushion member and the swing allowable range is restricted.

The swing allowable range of the movable body is, for example, set ±10° with respect to a posture in a non-excitation state of a shake correction drive mechanism (state that an electric current is not supplied to a coil). Further, in the stopper structure described in Patent Literature 2, a gap space of, for example, about 1 mm-2 mm is required to provide between the protruded part of the holder and the cushion member of the cover by a distance in a height in the optical axis direction corresponding to the swing allowable range.

Since the gap space is large, when a drop impact or the like is given, the movable body including the optical module may be projected by a distance of the gap space in the optical axis direction. Therefore, the clearance is required to increase so that the movable body does not collide with a cover glass of the fixed body which is disposed on the front side and thus the size of the device may be increased. Further, when the clearance is large, a deflecting amount of a gimbal mechanism also becomes large and thus the durability may be impaired.

SUMMARY

In view of the problems described above, at least an embodiment of the present invention provides an optical unit with a shake correction function in which a swing allowable range is surely restricted and a movement due to a drop impact or the like in an optical axis direction of a movable body is made small and thereby the size is reduced and durability is enhanced.

To achieve the above mentioned contents, at least an embodiment of the present invention provides an optical unit with a shake correction function including a fixed body, a movable body having an optical element, a swing support mechanism structured to swingably support the movable body with respect to the fixed body, and a shake correction drive mechanism structured to swing the movable body. The movable body includes a first abutting part which is abutted with a first stopper part of the fixed body at a time of a maximum swing, and a second abutting part which is abutted with a second stopper part of the fixed body at a time of a movement in a direction of an optical axis of the optical element. The second stopper part and the second abutting part are separated from each other so as not to contact with each other when the movable body is swung, and a separated distance along the direction of the optical axis between the second stopper part and the second abutting part is set to be smaller than a separated distance along the direction of the optical axis between the first abutting part and the fixed body.

In a case that the movable body is going to move in the optical axis direction when an impact is applied due to dropping or the like, the movement of the movable body is restricted to a small distance by abutting the second abutting part of the movable body with the second stopper part of the fixed body. Further, at the time of a swing correction, a swing allowable range is restricted by abutting the first abutting part of the movable body with the first stopper part of the fixed body. When the swing correction is going to be performed, the second abutting part and the second stopper part are not contacted with each other and thus a swing of the movable body is not obstructed.

Further, a separated distance along the optical axis direction between the second stopper part and the second abutting part is set to be smaller than a separated distance along the optical axis direction between the first abutting part and the fixed body and thus, in comparison with a case that the second stopper part and the second abutting part are not provided, a movement in the optical axis direction of the movable body can be made small and thus, the entire dimension in the optical axis direction can be made small and the size can be reduced.

In at least an embodiment of the present invention, it is preferable that each of the second abutting part and the second stopper part is formed in an inclined face which is inclined in a direction approaching the optical axis as going to an object side.

When viewed from an object side in the optical axis direction, the second abutting part is covered by the second stopper part and thus, a foreign matter such as dust can be restrained from entering through a space between the second abutting part and the second stopper part.

In at least an embodiment of the present invention, it is preferable that each of the second abutting part and the second stopper part is formed in a circular arc face with a swing support point of the movable body as a center.

A distance between the second abutting part and the second stopper part can be set constant during a swing correction and thus the separated distance can be further reduced.

In at least an embodiment of the present invention, it is preferable that each of the second abutting part and the second stopper part is formed in a ring shape along a circumferential direction around the optical axis.

According to this structure, even in a case that the movable body is swung in any direction, the moving range can be restricted adequately. In a case that the second abutting part and the second stopper part are formed in an inclined face, when viewed from an object side in the optical axis direction, the entire periphery of the second abutting part of the movable body is covered by the second stopper part of the fixed body and thus, its design is excellent and a foreign matter such as dust is surely prevented from entering.

In at least an embodiment of the present invention, it is preferable that the second abutting part and the second stopper part are disposed so that at least parts of the second abutting part and the second stopper part are overlapped with each other in the direction of the optical axis at a time of a maximum swing by the shake correction drive mechanism.

Even in a case that an external force is acted in the optical axis direction at a time of swinging by a shake correction, the second abutting part is capable of being abutted with the second stopper part and thus a moving range of the movable body can be restricted adequately.

In at least an embodiment of the present invention, it is preferable that the movable body includes an optical module having the optical element, and a gravity center adjustment member which is provided in the optical module on an object side in the direction of the optical axis for adjusting a gravity center position of the movable body in the direction of the optical axis, and the second abutting part is provided in the gravity center adjustment member.

A gravity center of the movable body and the swing center can be coincided with each other or come close to each other by the gravity center adjustment member and thus the movable body can be swung effectively. Further, the second abutting part is provided in the gravity center adjustment member and thus, in comparison with a case that the second abutting part is provided in the optical module, influence on the optical module due to an impact can be reduced.

In at least an embodiment of the present invention, it is preferable that the shake correction drive mechanism is structured of a magnet and a coil, one of the magnet and the coil is provided in the fixed body, and the other is provided in the movable body, and the first abutting part is provided in a holding member which holds the other of the magnet and the coil in the movable body.

A member of the movable body which holds the coil or the magnet of the shake correction drive mechanism is also used as the first abutting part and thus, in comparison with a case that the first abutting part is separately provided, the number of parts can be reduced.

According to at least an embodiment of the present invention, a swing allowable range is surely restricted and a movement in the optical axis direction of the movable body due to a drop impact or the like is made small and thereby the size is reduced and durability is enhanced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 12A shows a state that a movable body is moved in an optical axis direction from the state in FIG. 11, and FIG. 12B shows a state that a movable body is moved in a direction perpendicular to an optical axis from the state in FIG. 11.

FIG. 14A shows a state at a time of a maximum swing of a movable body from the state in FIG. 13, and FIG. 14B shows a state that a movable body is moved in an optical axis direction from the state in FIG. 13.

DETAILED DESCRIPTION

An optical unit with a shake correction function in accordance with at least an embodiment of the present invention will be described below with reference to the accompanying drawings.

In the following descriptions, three directions perpendicular to each other are respectively set in an "X"-axis direction, a "Y"-axis direction and a "Z"-axis direction and, in a stationary state, it is assumed that an optical axis "L" (lens optical axis/optical axis of an optical element) is disposed in the "Z"-axis direction. Further, regarding shakes in the respective directions, a turning around the "X"-axis corresponds to pitching (vertical swing) and a turning around the "Y"-axis corresponds to yawing (lateral swing). Further, "+X" is indicated on one side in the "X"-axis direction, "−X" is indicated on the other side, "+Y" is indicated on one side in the "Y"-axis direction, "−Y" is indicated on the other side, "+Z" is indicated on one side in the "Z"-axis direction (object side/front side in the optical axis direction), and "−Z" is indicated on the other side (opposite side to an object side/rear side in the optical axis direction). Further, in FIGS. 1 through 8, a state that one side "+Z" is directed toward an upper side in the "Z"-axis is a stationary state. The following are described in a stationary state unless otherwise specified.

First Embodiment (Schematic Structure of Optical Unit 101 with Shake Correction Function)

Figure 1:
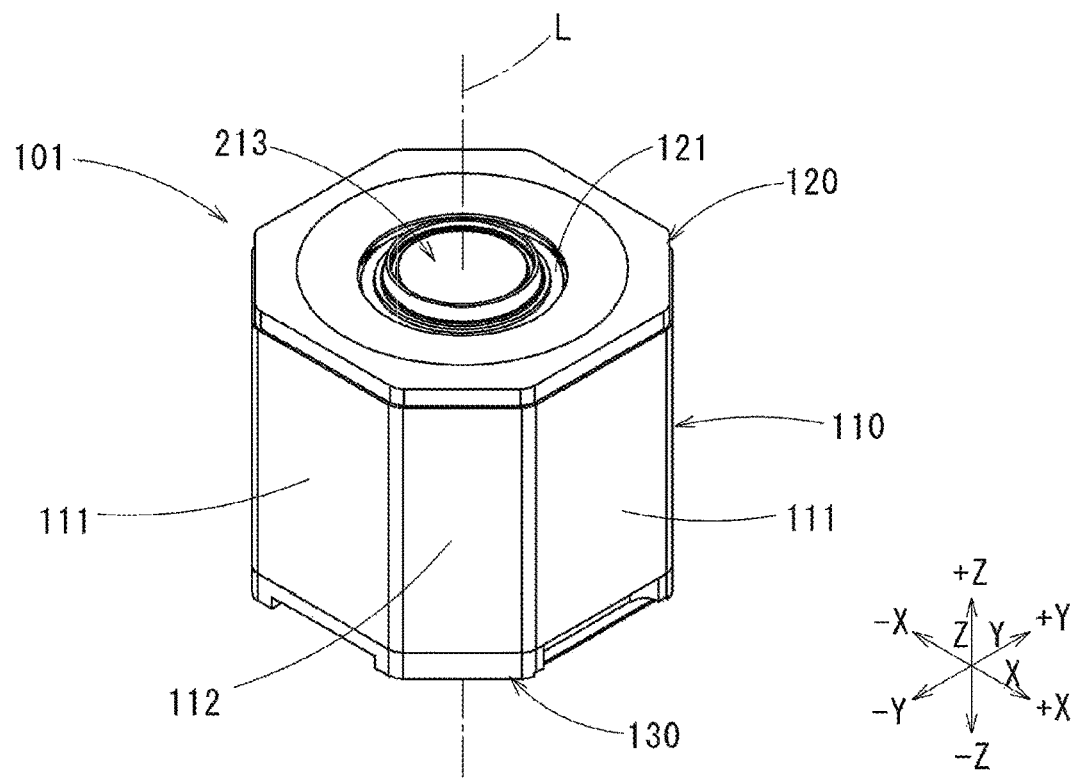
FIG. 1 is a perspective view showing an assembled state of an optical unit with a shake correction function in accordance with a first embodiment of the present invention.
Figure 2:
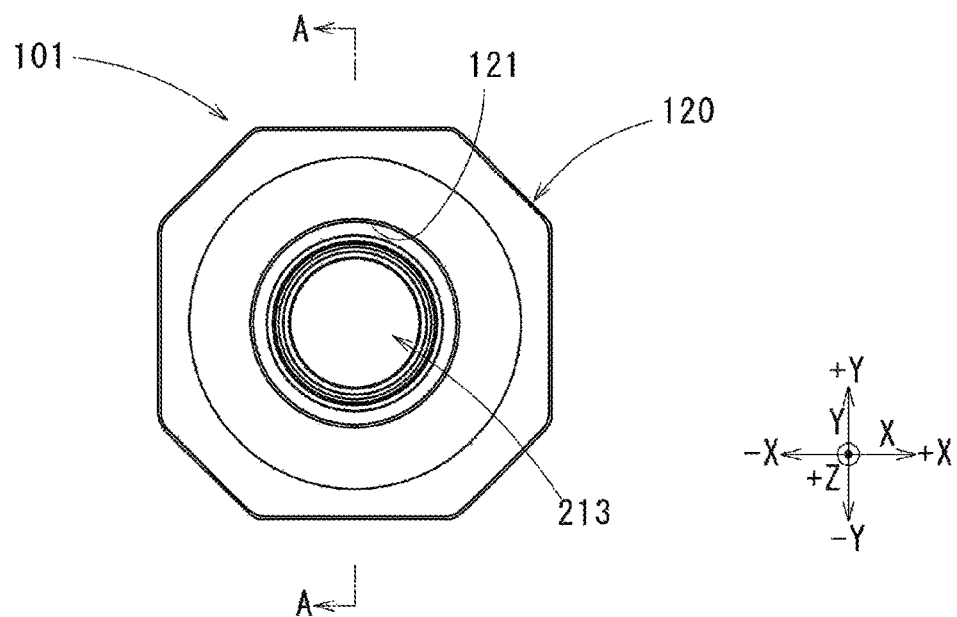
FIG. 2 is a plan view showing the optical unit with a shake correction function in accordance with the first embodiment.
Figure 3:
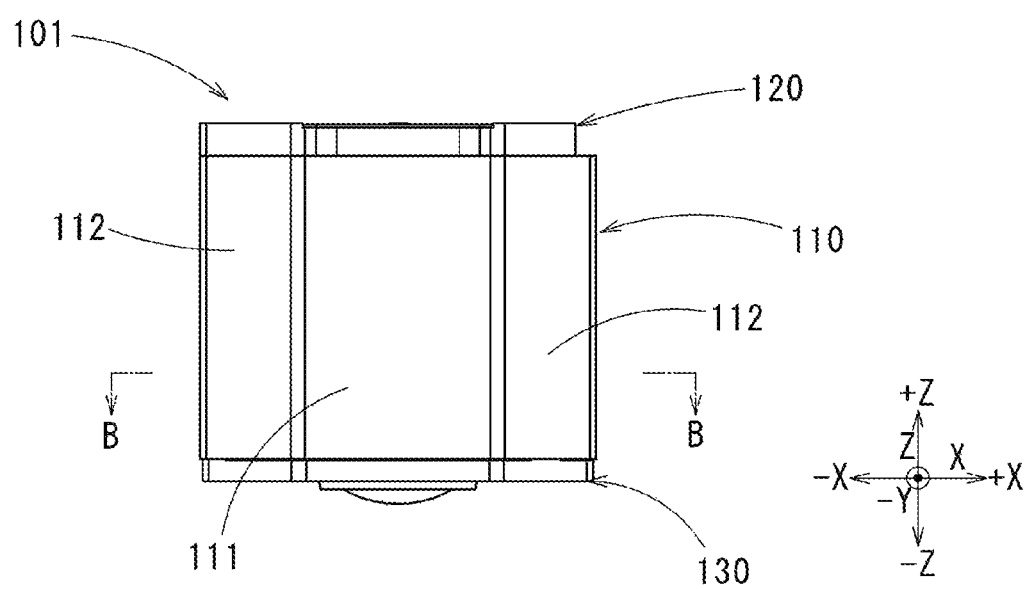
FIG. 3 is a side view showing the optical unit with a shake correction function in accordance with the first embodiment.
Figure 4:
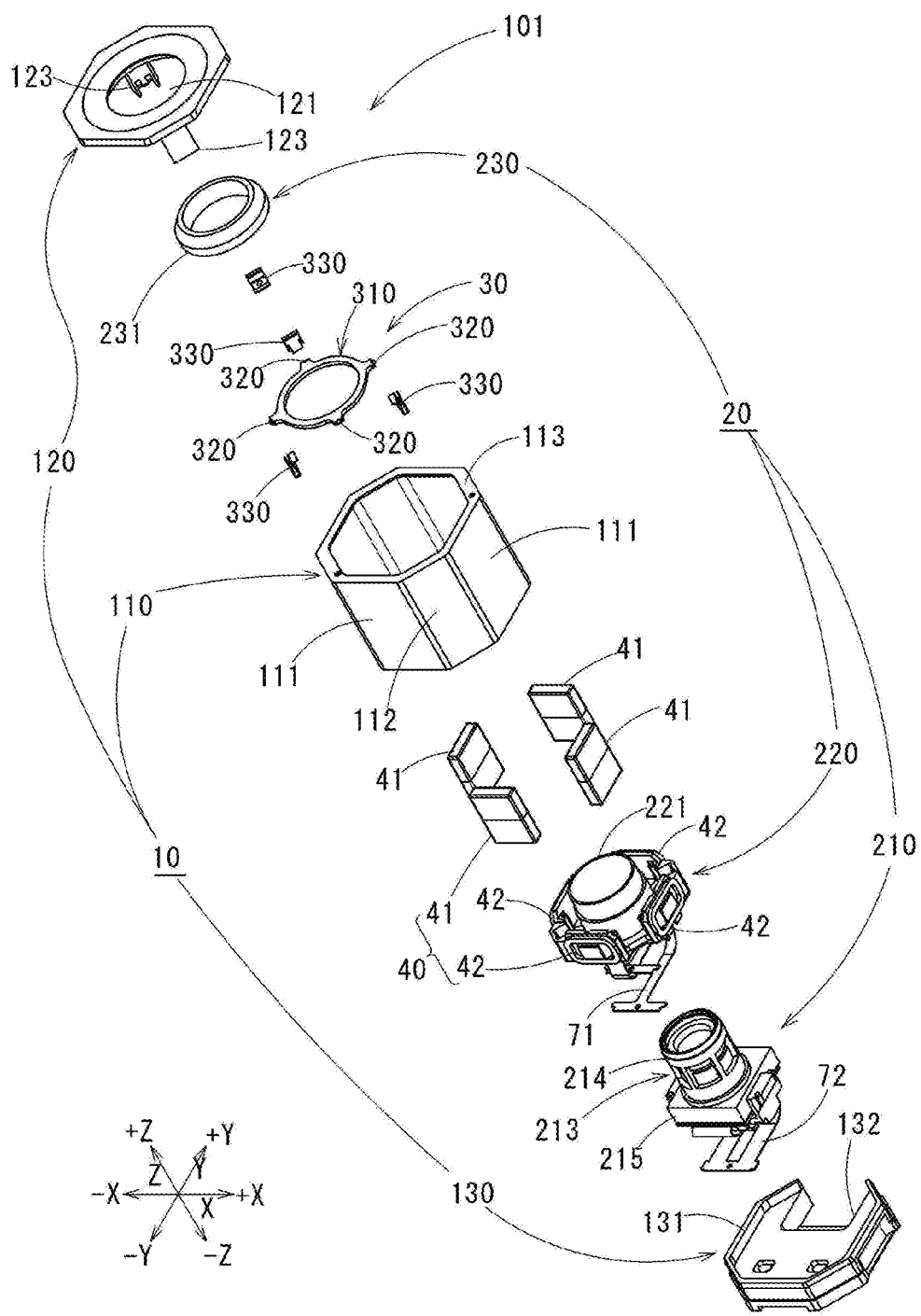
FIG. 4 is an exploded perspective view showing the optical unit with a shake correction function in accordance with the first embodiment.
Figure 5:
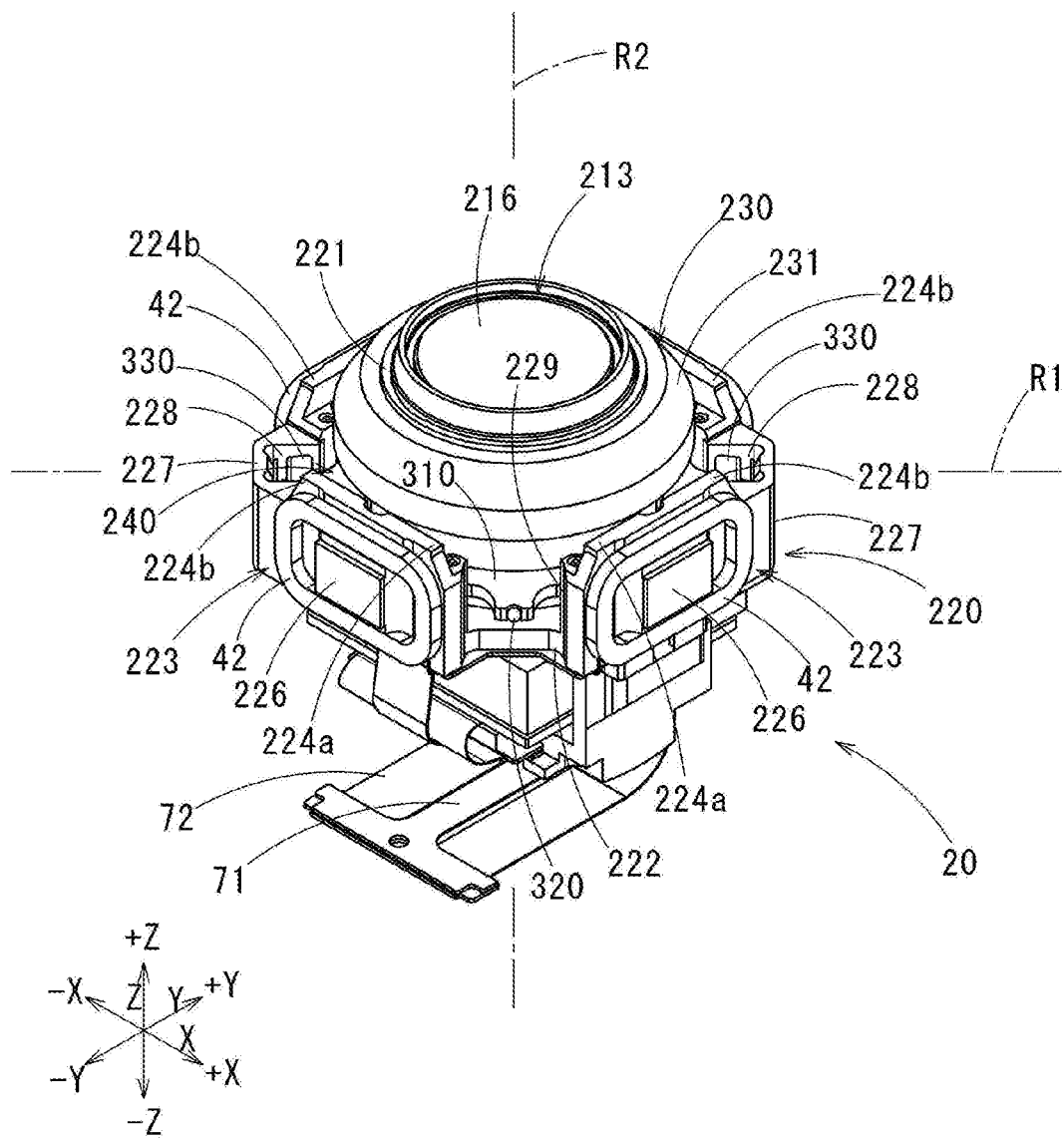
FIG. 5 is a perspective view showing a movable body in the optical unit with a shake correction function in accordance with the first embodiment.
Figure 6:
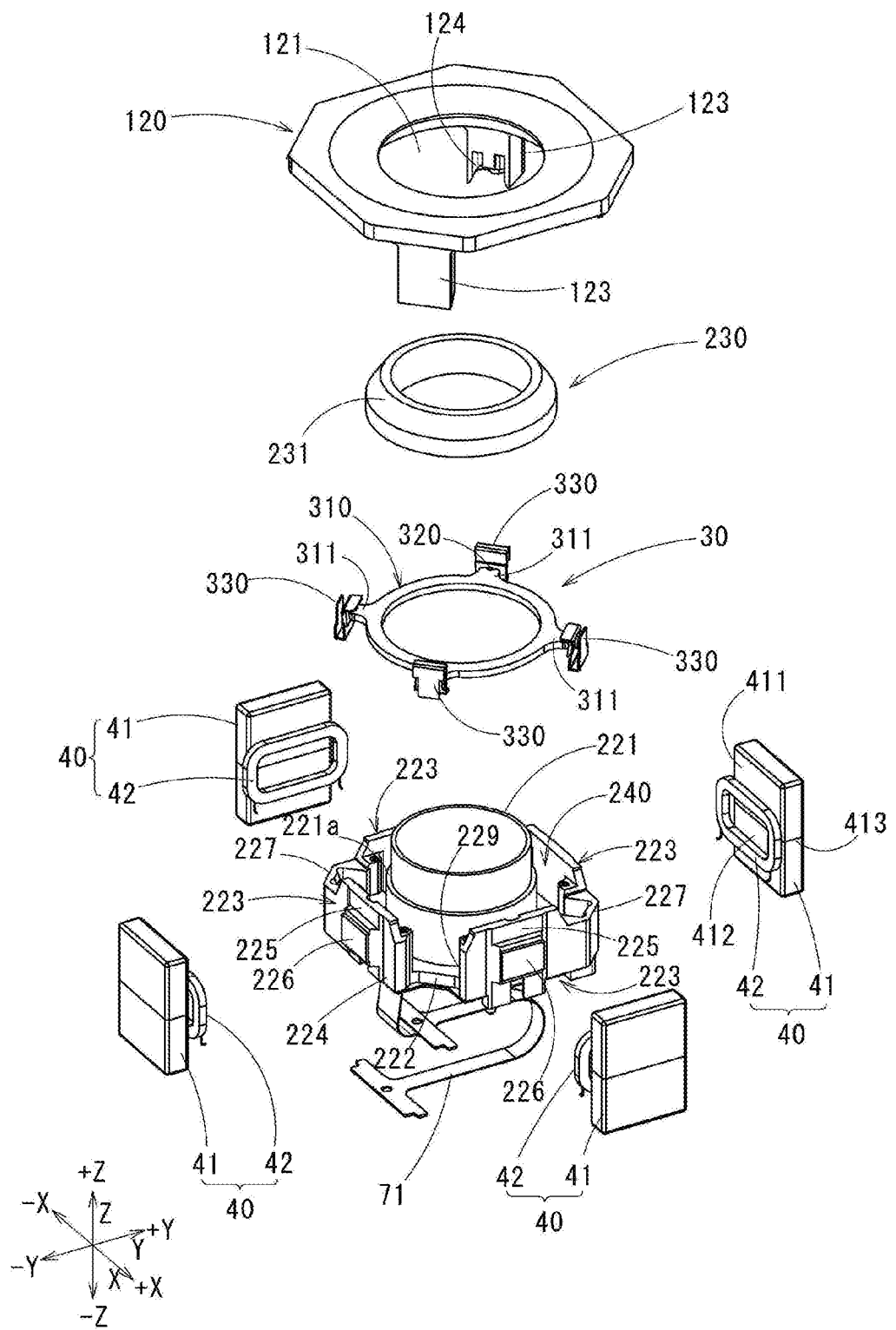
FIG. 6 is an exploded perspective view showing a part of the optical unit with a shake correction function in accordance with the first embodiment which is viewed from an object side.
Figure 7:
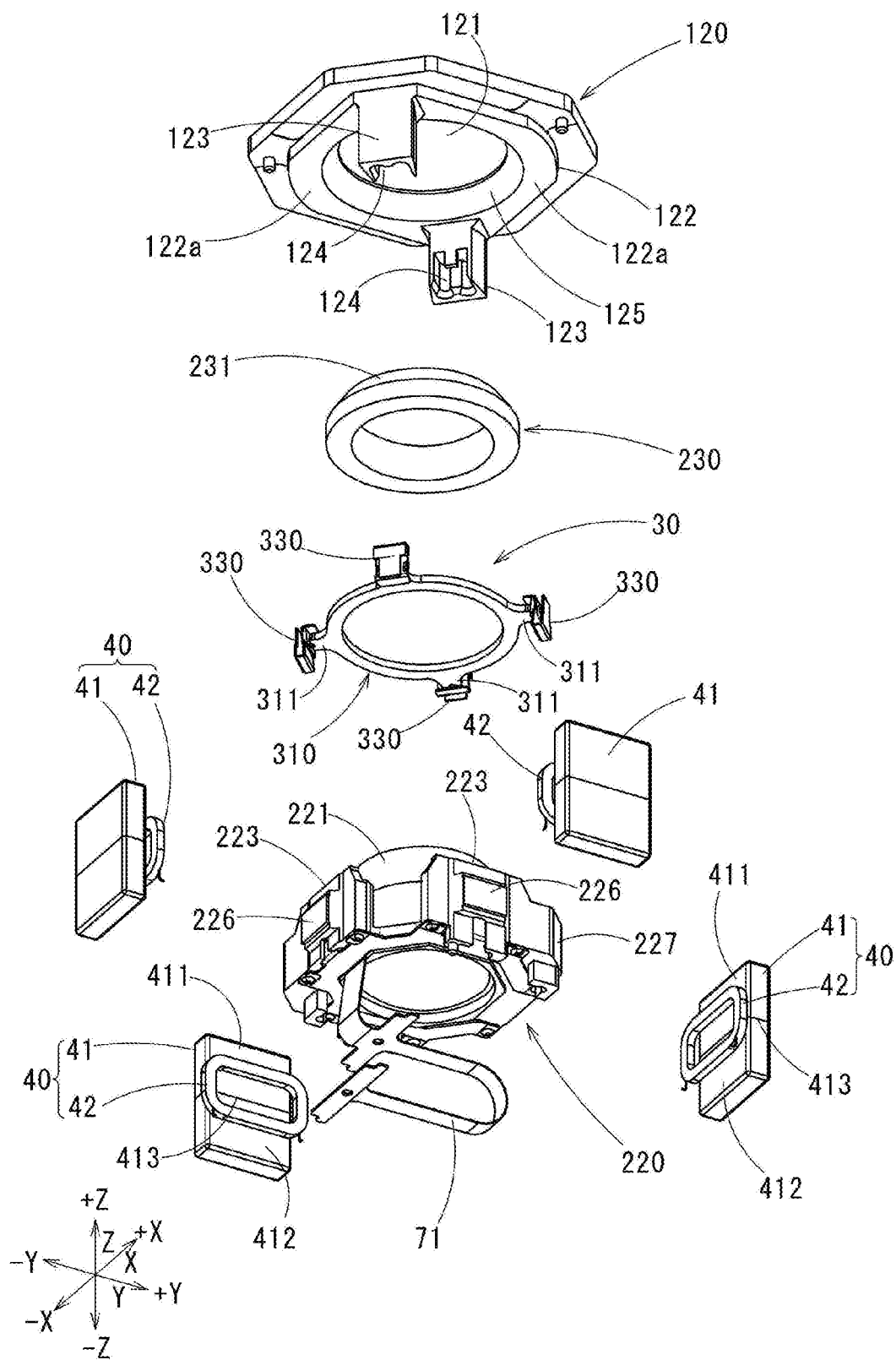
FIG. 7 is an exploded perspective view showing the part of the optical unit with a shake correction function which is viewed from an opposite side to the state shown in FIG. 6.
Figure 8:
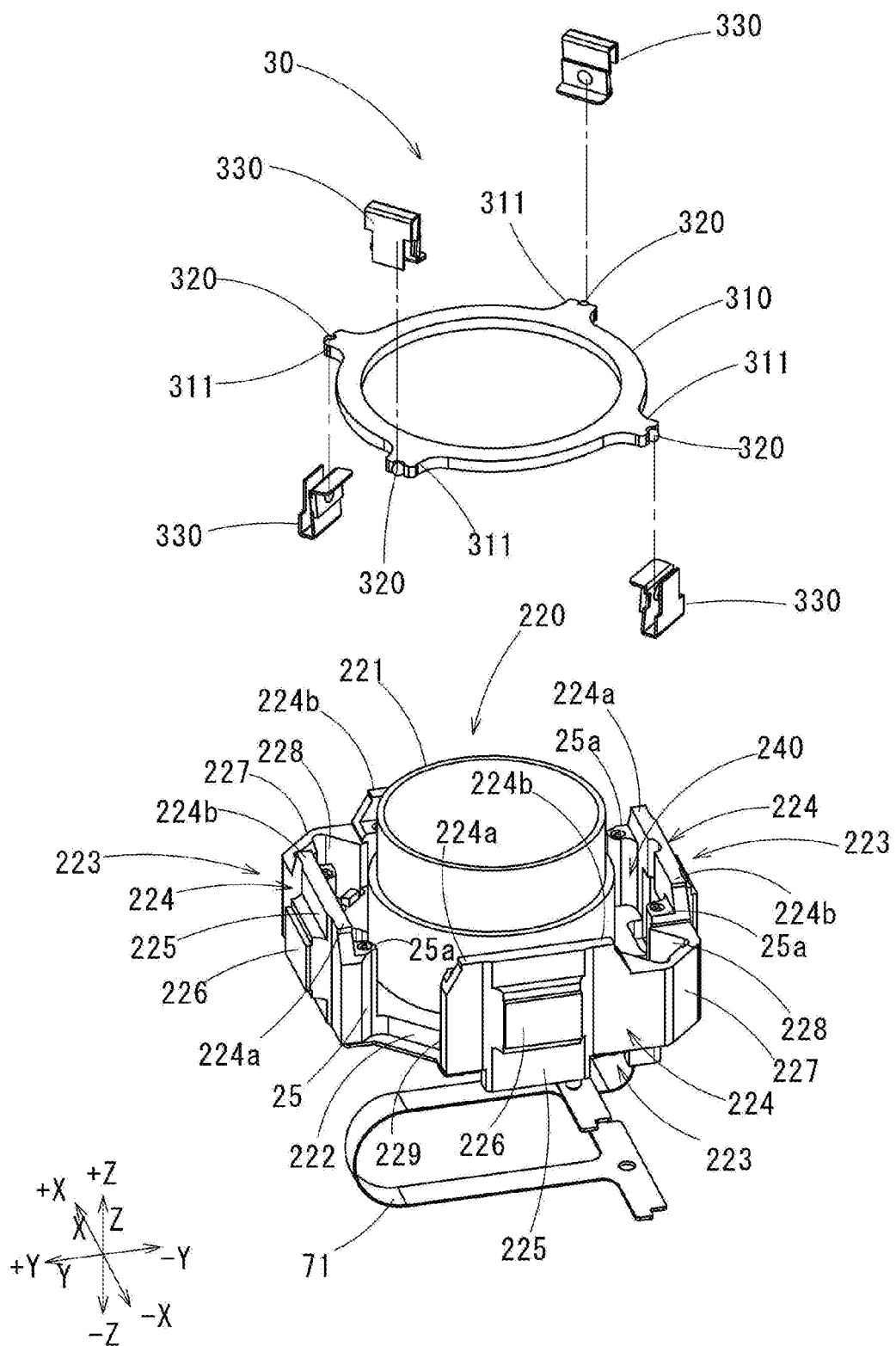
FIG. 8 is a perspective view showing a gimbal mechanism and a holder frame in the optical unit with a shake correction function in accordance with the first embodiment.
Figure 9:
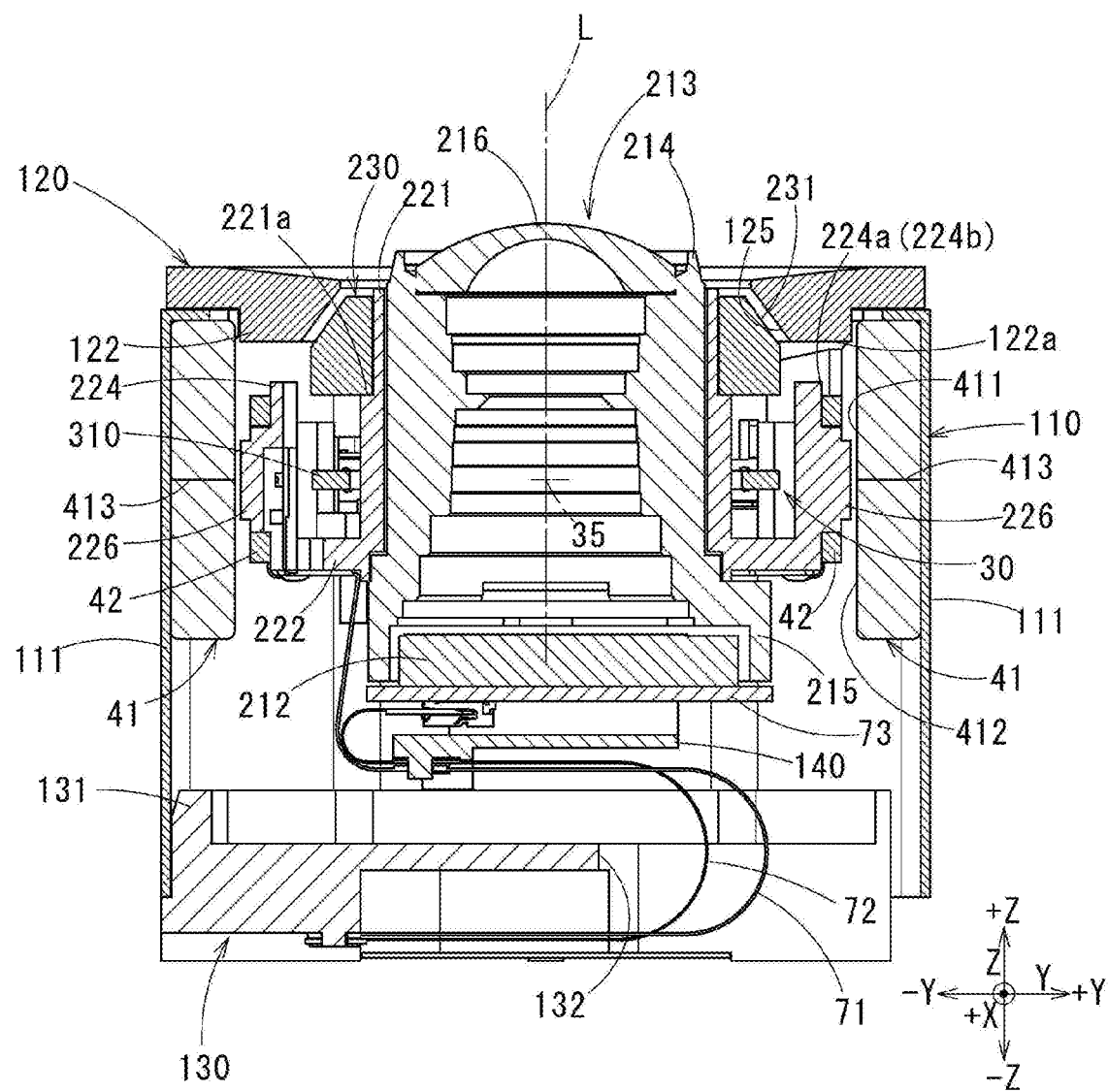
FIG. 9 is a longitudinal cross-sectional view showing the optical unit with a shake correction function which is cut along "A-A" line in FIG. 2.
Figure 10:
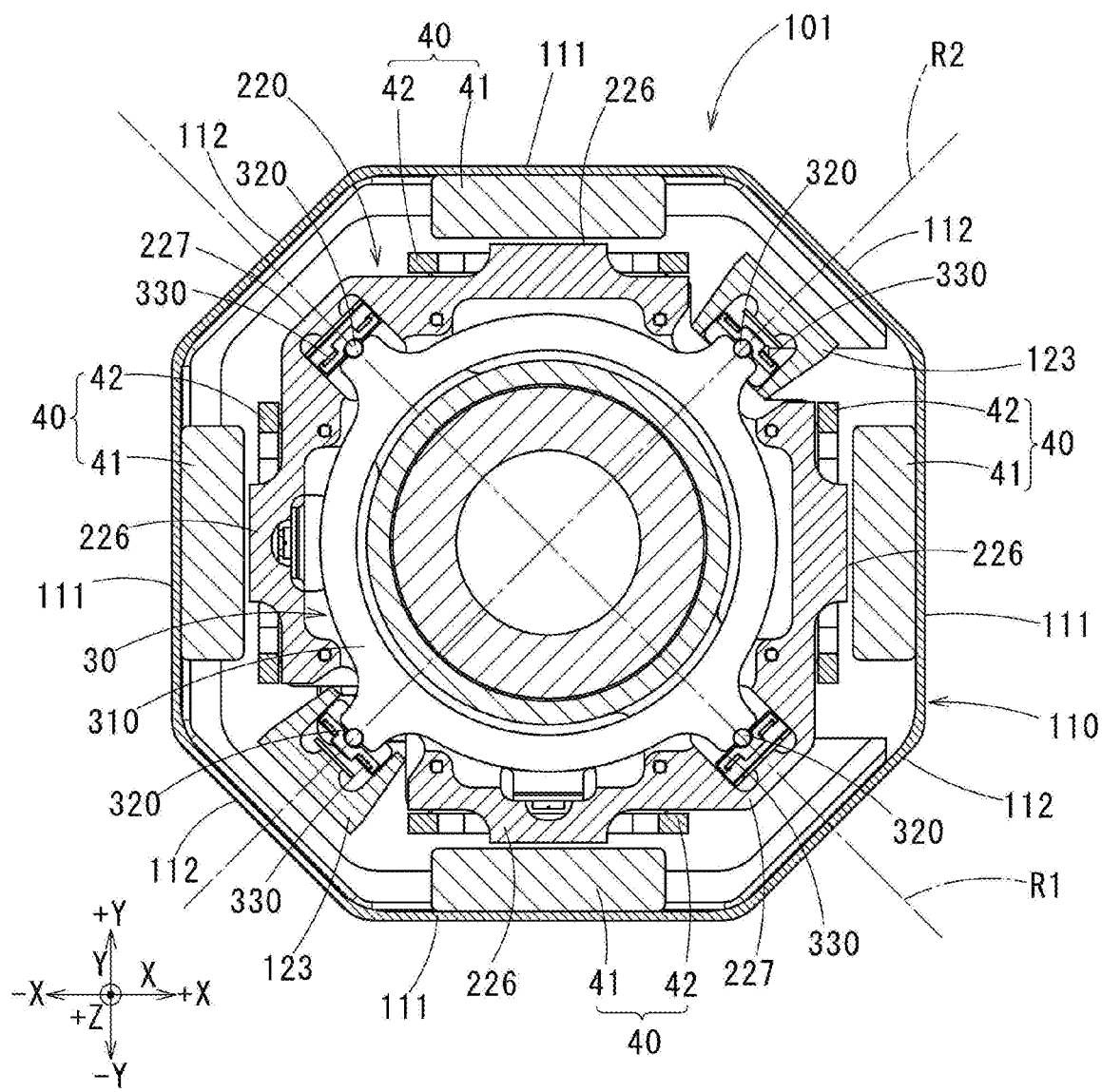
FIG. 10 is a transversal cross-sectional view showing the optical unit with a shake correction function which is cut along "B-B" line in FIG. 3.

FIGS. 1 through 3 show an outward appearance in an assembled state of an optical unit 101 with a shake correction function (hereinafter, referred to as an optical unit 101). FIG. 4 shows the optical unit 101 which is exploded along an optical axis "L" direction. FIG. 5 is a perspective view showing a movable body 20 described below of the optical unit 101. FIG. 6 is an exploded perspective view showing a part of the optical unit 101 which is viewed from an object side, and FIG. 7 is an exploded perspective view which is viewed from an opposite side. FIG. 8 shows a gimbal mechanism 30 and a holder frame 220 described below. FIG. 9 is a longitudinal cross-sectional view which is cut by the "Y-Z" plane passing through an optical axis "L", and FIG. 10 is a transversal cross-sectional view which is cut by the "X-Y" plane in the vicinity of a gimbal mechanism 30.

The optical unit 101 shown in these drawings is a thin camera which is incorporated into an optical device (not shown) such as an imaging device which is mounted on a portable terminal, a drive recorder and an unmanned helicopter. The optical unit 101 is mounted in a state supported by a chassis (device main body) of the optical device. In this type optical unit 101, when a hand shake or the like is occurred in the optical device at a time of photographing, disturbance occurs in a photographed image. Therefore, the optical unit 101 in this embodiment is structured that a movable body 20 including an optical module (optical element) 210 whose optical axis "L" is extended along the "Z"-axis direction is swung based on a detected result of a shake by a shake detection sensor (not shown) such as a gyroscope and pitching and yawing are corrected.

In FIGS. 1 through 4, the optical unit 101 in this embodiment includes a fixed body 10, a movable body 20 having an optical module 210, a gimbal mechanism 30 as a swing support mechanism structured to set in a state that the movable body 20 is swingably supported with respect to the fixed body 10, and a shake correction drive mechanism 40 structured to swing the movable body 20. Further, as shown in FIG. 10, the movable body 20 is supported with respect to the fixed body 10 swingably around two axial lines "R1" and "R2" perpendicular to the optical axis "L" direction through the gimbal mechanism 30. One of the two axial lines is referred to as a first axial line "R1" and the other is referred to as a second axial line "R2". The first axial line "R1" and the second axial line "R2" are perpendicular to each other and are disposed at an angle of 45° with respect to the "X"-axis and the "Y"-axis.

In the optical unit 101 in this embodiment, the fixed body 10 is formed in an octagonal shape when viewed in the optical axis "L" direction ("+Z" direction).

(Structure of Fixed Body 10)

As shown in FIGS. 1 through 4, the fixed body 10 includes a case 110 in a polygonal tube shape which surrounds around the movable body 20, a cover frame 120 which is fixed to an upper end of the case 110 (one side "+Z" in the "Z"-axis direction), and a bottom cover 130 which is disposed on a lower end of the case 110 (the other end side "−Z" in the "Z"-axis direction).

In this embodiment, the case 110 is formed in a polygonal tube shape (tube shape with octagonal transverse cross-section in the example shown in the drawing) by a plurality of side plate parts 111 and 112, and an inward flange 113 is integrally formed at its upper end (one side "+Z" in the "Z"-axis direction).

A plan-view outer shape of the cover frame 120 is formed in an octagonal shape along an outer shape of the case 110 and is formed in a polygonal frame shape which is projected to an inner side in a radial direction from an end part of the case 110 on one side "+Z" in the "Z"-axis direction. A center part of the cover frame 120 is formed with a circular opening window 121 through which light from an object to be photographed is led to the optical module 210. Further, as shown in FIG. 7, a protruded part 122 is provided in a ring shape on a rear face of the cover frame 120, in the other words, on the other side "−Z" in the "Z"-axis direction. The protruded part 122 is integrally provided with support plate parts 123 for attaching a contact point spring 330 of the gimbal mechanism 30 described below at positions facing each other at 180°. The support plate parts 123 are protruded to the other side "−Z" in the "Z"-axis direction and are formed with groove parts 124 on opposing faces in the radial direction (direction of 45° with respect to the "X"-axis and the "Y"-axis in the example shown in the drawing).

In this embodiment, a surface 122a of the protruded part 122 of the cover frame 120 is a first stopper part which restricts a swing allowable range of a holder frame 220 described below. In the example shown in the drawing, the protruded part 122 is provided with the support plate parts 123 at positions facing each other at 180° and thus the first stopper part 122a is formed in two portions in a circular arc shape which avoid both the support plate parts 123.

A plan-view outer shape of the bottom cover 130 is, as shown in FIG. 4, formed in an octagonal shape along the outer shape of the case 110 and is integrally provided with a peripheral wall part 131 which is fitted to an inner side of the case 110. Further, the bottom cover 130 is formed with a cut-out part 132 for extending flexible circuit boards 71 and 72 for the shake correction drive mechanism 40, the optical module 210 and the like which are disposed inside the case 110 to the outside in a state that the bottom cover 130 is fixed to a lower end of the case 110. The flexible circuit boards 71 and 72 are, as shown in FIG. 9, extended to a rear side of the bottom cover 130 (the other side "–Z" in the "Z"-axis direction) through the cut-out part 132 of the bottom cover 130 and are fixed to a rear face of the bottom cover 130 and electrically connected with a host control part or the like which is provided on a main body side of the optical device.

(Structure of Movable Body 20)

As shown in FIGS. 4 and 5 and the like, the movable body 20 includes the optical module 210 having an optical element such as a lens, a holder frame 220 which holds the optical module 210, and a gravity center adjustment member 230 in a circular ring shape which is fixed to the holder frame 220.

The optical module 210 includes, as shown in FIG. 9, a lens holder 213 which holds a lens (not shown), an image pickup element (imaging part) 212, a focusing drive actuator (not shown) and the like and is held by the holder frame 220 through the lens holder 213.

The lens holder 213 is provided with a lens-barrel part 214 surrounding a lens group, a base part 215 which is integrally formed at a lower end of the lens-barrel part 214 and holds the image pickup element and the like, and a lens cover 216 which covers a front face of the lens-barrel part 214 (face on an object side).

The holder frame 220 structures an outer peripheral portion of the movable body 20 as shown in FIGS. 5 and 6 and the like. The holder frame 220 is provided with a holder holding part 221 in a tube shape which holds the lens holder 213 on an inner side, and a base part 222 which is enlarged in a flange shape from a lower end part of the holder holding part 221 (end part on the other side "–Z" in the "Z"-axis direction). Further, coil holding parts 223 are provided on an outer peripheral part of the base part 222 so that each of the coil holding parts 223 holds each of four coils 42 structuring the shake correction drive mechanism 40 described below on an outer side in the radial direction with respect to the holder holding part 221. A movable frame arrangement space 240 in which a movable frame 310 of the gimbal mechanism 30 described below is disposed is formed between the coil holding parts 223 and the holder holding part 221.

The four coil holding parts 223 are disposed at intervals of 90° around the "Z"-axis and are provided on one side "+X" and the other side "–X" in the "X"-axis direction and on one side "+Y" and the other side "–Y" in the "Y"-axis direction respectively. Each of the coil holding parts 223 is provided with a support plate part 224 which is stood up in the "Z"-axis direction from a peripheral edge part of the base part 222, a coil abutting part 225 which is protruded from a part of an outer face of the support plate part 224 and is abutted with a back face of the coil 42 when the coil 42 is held, and a protruded part 226 which is further protruded with respect to the coil abutting part 225 and fitted to an inner side of the coil 42. The support plate part 224 of each of the coil holding parts 223 is disposed so as to be perpendicular to the "X"-axis direction or the "Y"-axis direction and thus, the coil abutting parts 225 and the protruded parts 226 of the outer faces of the respective support plate parts 224 are disposed toward one side "+X" and the other side "–X" in the "X"-axis direction, and toward one side "+Y" and the other side "–Y" in the "Y"-axis direction.

Further, when the ring-shaped coil 42 is attached so as to fit to the protruded part 226 of each of the coil holding parts 223 and a back face of the coil 42 is abutted with the coil abutting part 225, an attaching posture of the coil 42 is restricted. Therefore, the coil 42 is provided toward one side "+X" and the other side "–X" in the "X"-axis direction, and toward one side "+Y" and the other side "–Y" in the "Y"-axis direction.

In this case, the protruded part 226 of each of the coil holding parts 223 is further protruded toward an outer side from an outer face of the coil 42 (face facing a magnet 41 described below) in a state that the coil 42 is held. On the other hand, as described below, magnets 41 provided inside the case 110 of the fixed body 10 face the respective coils 42. Therefore, when the movable body 20 is displaced in the "X"-axis direction or the "Y"-axis direction by an external force, the protruded part 226 of the coil holding part 223 is abutted with the magnet 41 and thus abutting of the coil 42 with the magnet 41 is prevented (see FIG. 12B).

Further, the support plate parts 224 of the two coil holding parts 223 adjacent to each other in a circumferential direction are respectively connected by a connecting part 227. Specifically, the support plate parts 224 of the two coil holding parts 223 provided on one side "+X" in the "X"-axis direction and on one side "+Y" in the "Y"-axis direction are set in a connected state by the connecting part 227, and the support plate parts 224 of the two coil holding parts 223 provided on the other side "–X" in the "X"-axis direction and on the other side "–Y" in the "Y"-axis direction are set in a connected state by the connecting part 227. As a result, the two connecting parts 227 are diagonally disposed at positions on a line intersecting 45° with respect to the "X"-axis and the "Y"-axis, in other words, disposed at positions opposed by 180° in a direction where the first axial line "R1" is extended, and the groove parts 228 are formed on the opposing faces (see FIGS. 5 and 10).

On the other hand, the coil holding parts 223 provided on one side "+X" in the "X"-axis direction and on the other side "–Y" in the "Y"-axis direction are separated from each other, and the coil holding parts 223 provided on the other side "–X" in the "X"-axis direction and on one side "+Y" in the "Y"-axis direction are separated from each other. Therefore, open spaces 229 between the coil holding parts 223 are diagonally disposed at positions on a line intersecting 45° with respect to the "X"-axis and the "Y"-axis, in this case, at positions opposed by 180° in a direction where the second axial line "R2" is extended. The support plate parts 123 of the cover frame 120 are disposed in the open spaces 229.

Further, the base part 215 of the lens holder 213 is disposed on a lower side ("–Z" side in the "Z"-axis direction) to the holder frame 220, and the lens-barrel part 214 is held by the holder frame 220 in a state that the lens-barrel part 214 is penetrated through the holder holding part 221 of the holder frame 220 and protruded to the "+Z" side in the "Z"-axis direction.

Further, the gravity center adjustment member 230 in a ring shape is attached to an upper end part of the tube-shaped holder holding part 221 of the holder frame 220 (end part on one side "+Z" in the "Z"-axis direction) so as to surround the upper end part. The gravity center adjustment member 230 is provided for adjusting a gravity center position of the movable body 20 in the optical axis direction, and the gravity center adjustment member 230 is provided so that the gravity center position of the movable body 20 is coincided with a swing support point 35 described below.

In this case, a step part 221*a* is formed in an outer peripheral part of the holder holding part 221 and the gravity center adjustment member 230 is attached on the step part 221*a* and fixed by adhesion or the like.

In this embodiment, the holder frame 220 is formed of synthetic resin, and the holder holding part 221, the base part 222 and the coil holding part 223 are integrally formed with each other.

The image pickup element 212, the focusing drive actuator and the like provided on the movable body 20 are electrically connected with a signal output (communication) flexible circuit board 71. The image pickup element 212 is, as shown in FIG. 9, connected with a mounting board 73 on which electronic components such as a gyroscope and a capacitor are mounted, and the flexible circuit board 71 described above is connected with the mounting board 73.

On the other hand, the coils 42 structuring the shake correction drive mechanism 40 are connected with a power feeding flexible circuit board 72. These flexible circuit boards 71 and 72 are extended to an outer side through the cut-out part 132 of the bottom cover 130 as described above and are electrically connected with the host control part provided in the main body of the optical device.

The flexible circuit boards 71 and 72 are, as shown in FIG. 9 and the like, extended to an outer side after being curved a plurality of times on a lower side with respect to the lens holder 213 (the other side "−Z" in the "Z"-axis direction). As shown in FIG. 5, the flexible circuit board 72 connected with the coils 42 is disposed between two divided portions of the flexible circuit board 71 connected with the optical module 210, and the extended directions of the two flexible circuit boards 71 and 72 to the outside are aligned with each other. Further, each of the flexible circuit boards 71 and 72 has flexibility so that movement of the holder frame 220 and the optical module 210 held by the holder frame 220 by the shake correction drive mechanism 40 is not disturbed.

(Structure of Shake Correction Drive Mechanism 40)

The shake correction drive mechanism 40 is, as shown in FIGS. 4 and 6 and the like, a magnetic drive mechanism which utilizes the plate-shaped magnet 41 and the coil 42 which acts an electromagnetic force in a magnetic field of the magnet 41. In this embodiment, a combination of the magnet 41 and the coil 42 is provided at four positions at intervals of 90° in the circumferential direction of the movable body 20 (holder frame 220). Further, as shown in FIGS. 9 and 10, each of the magnets 41 is held by the case 110 and each of the coils 42 is held by the holder frame 220 and, in this embodiment, the shake correction drive mechanism 40 is structured between the case 110 and the holder frame 220.

The magnets 41 are respectively held by inner faces of the four respective side plate parts 111 which are disposed at intervals of 90° in the circumferential direction of the case 110. The side plate parts 111 are respectively disposed on one side "+X" and the other side "−X" in the "X"-axis direction, and on one side "+Y" and the other side "−Y" in the "Y"-axis direction. Therefore, the magnet 41 and the coil 42 are faced each other between the case 110 and the holder frame 220 on each of one side "+X" in the "X"-axis direction, the other side "−X" in the "X"-axis direction, one side "+Y" in the "Y"-axis direction and the other side "−Y" in the "Y"-axis direction.

In this embodiment, each of the four magnets 41 is magnetized so that poles of an inner face side and an outer face side are different from each other. Further, the magnet 41 is magnetized in a two-divided state in the optical axis "L" direction ("Z"-axis direction), and magnetic poles 411 and 412 located on the coil 42 side (inner face side) are magnetized different from each other in the optical axis "L" direction (see FIGS. 6,7 and 9). Therefore, a magnetized polarizing line 413 which divides the magnetic poles 411 and 412 is disposed along a direction perpendicular to the optical axis "L". The magnetized polarizing line 413 of each of the two magnets 41 respectively disposed on one side "+X" in the "X"-axis direction and on the other side "−X" in the "X"-axis direction is disposed along the "Y"-axis direction, and the magnetized polarizing line 413 of each of the two magnets 41 disposed on one side "+Y" in the "Y"-axis direction and on the other side "−Y" in the "Y"-axis direction is disposed along the "X"-axis direction.

In this embodiment, magnetized patterns of an outer face side and an inner face side in the four magnets 41 are the same as each other. Therefore, the magnets 41 adjacent to each other in the circumferential direction are not attracted to each other and thus, assembling and the like are easily performed. Further, the case 110 is made of magnetic material and functions as a yoke for the magnets 41.

The coil 42 is an air core coil which does not have a core and, as described above, the coil 42 is held on one side "+X" in the "X"-axis direction, the other side "−X" in the "X"-axis direction, one side "+Y" in the "Y"-axis direction and the other side "−Y" in the "Y"-axis direction of the holder frame 220. In the four coils 42, the both coils 42 disposed on one side "+X" in the "X"-axis direction and the other side "−X" in the "X"-axis direction of the holder frame 220 are formed by a winding wire in a ring shape with the "X"-axis direction as an axial center direction of the coil. Further, the both coils 42 disposed on one side "+Y" in the "Y"-axis direction and the other side "−Y" in the "Y"-axis direction are formed by a winding wire in a ring shape with the "Y"-axis direction as an axial center direction of the coil. Therefore, each of the coils 42 is formed in a ring shape with a direction perpendicular to the optical axis "L" direction as an axial center direction of the coil. Further, the four coils 42 are formed in the same planar shape and have the same thickness (height) dimension.

In the four coils 42, the two coils 42 whose axial center directions are the "X"-axis direction are formed in a rectangular shape which is extended in the "Y"-axis direction. Further, the two coils 42 whose axial center directions are the "Y"-axis direction are formed in a rectangular shape which is extended in the "X"-axis direction. Further, long side parts disposed on an upper side and a lower side of each coil 42 are utilized as effective sides facing the magnetic poles 411 and 412 of each magnet 41 and, in a state that the coil 42 is not excited, both effective sides are disposed parallel to the magnetized polarizing line 413 of the facing magnet 41 at positions separated from the magnetized polarizing line 413 by the same distance in the upper and lower direction (see FIGS. 6 and 7).

(Structure of Gimbal Mechanism 30)

In the optical unit 101 in this embodiment, in order to correct shakes in a pitching direction and a yawing direction, the movable body 20 is swingably supported around the first axial line "R1" intersecting the optical axis "L" direction and swingably supported around the second axial line "R2"

intersecting the optical axis "L" direction and the first axial line "R1". Therefore, a gimbal mechanism (swing support mechanism) 30 is structured between the fixed body 10 and the movable body 20.

In this embodiment, the gimbal mechanism 30 has a movable frame 310 in a circular ring shape. The movable frame 310 is, as shown in FIG. 5 and the like, disposed in the movable frame arrangement space 240 of the holder frame 220 and, in the "Z"-axis direction, the movable frame 310 is disposed between an under face (face on the other side "−Z" in the "Z"-axis direction) of the cover frame 120 of the fixed body 10 and an upper face (face on one side "+Z" in the "Z"-axis direction) of the base part 222 of the holder frame 220 of the movable body 20.

In this embodiment, the movable frame 310 is made of metal material and the like having a spring property and is integrally formed with protruding parts 311 at four positions at intervals of 90° in the circumferential direction so as to protrude to outer sides in the radial direction with respect to the center of the ring-shaped movable frame 310. Each of the protruding parts 311 is fixed with a spherical body 320 by welding and the like so that a convex surface in a hemispherical shape is further protruded to an outer side in the radial direction.

In the movable frame 310, two of the four spherical bodies 320 diagonally located are disposed in a direction where the first axial line "R1" described above is extended, and the two spherical bodies 320 diagonally located at other angles are disposed in a direction where the second axial line "R2" is extended.

Further, the two spherical bodies 320 disposed in the extending direction of the first axial line "R1" are supported by contact point springs 330 provided in the holder frame 220, and the two spherical bodies 320 disposed in the extending direction of the second axial line "R2" are supported by contact point springs 330 fixed to the cover frame 120.

On the upper face of the base part 222 of the holder frame 220, as shown in FIG. 5, a groove part 228 which is opened toward one side "+Z" in the "Z"-axis direction is formed in each of the two connecting parts 227 diagonally located in the direction where the first axial line "R1" is extended. The contact point springs 330 are respectively attached to the respective groove parts 228, and the two spherical bodies 320 diagonally located in the direction where the first axial line "R1" is extended are respectively supported by the contact point springs 330.

On the other hand, the rear face of the cover frame 120 is formed with a pair of support plate parts 123 at positions diagonally opposing each other at 180° so as to protrude toward the "−Z" in the "Z"-axis direction, and the contact point spring 330 is attached to the groove part 124 on an inner side of each of the support plate parts 123. Further, the support plate parts 123 of the cover frame 120 are disposed in the open spaces 229 between the coil holding parts 223 of the holder frame 220 and thereby the contact point spring 330 is disposed at two positions diagonally located in the direction where the second axial line "R2" is extended, and two spherical bodies 320 are respectively supported by the contact point springs 330 at positions diagonally located in the direction where the second axial line "R2" is extended.

Each of the contact point springs 330 is formed in a bent shape by press-forming an elastically deformable plate member made of metal such as stainless steel so as to be in a "U"-shape in longitudinal cross section. The contact point spring 330 applies an elastic load (elastic force) to a contact point with the spherical body 320 provided in the movable frame 310 toward an inner side from an outer side in the radial direction. In other words, each of the spherical bodies 320 provided in the four protruding parts 311 of the movable frame 310 is elastically contacted with each of the contact point springs 330 attached to the cover frame 120 of the fixed body 10 or the holder frame 220 of the movable body 20 from an outer side in the radial direction.

In this case, as shown in FIG. 10, the contact point springs 330 fixed to the holder frame 220 face each other and are paired in the first axial line "R1" direction and structure first swing support points between the spherical bodies 320 of the movable frame 310 and the contact point springs 330. On the other hand, the contact point springs 330 fixed to the cover frame 120 face each other and are paired in the second axial line "R2" direction and structure second swing support points between the spherical bodies 320 of the movable frame 310 and the contact point springs 330. Therefore, a swing center position (swing support point) 35 of the movable body 20 is disposed at an intersection point of the first axial line "R1" with the second axial line "R2" which is obtained by combining the first swing support points with the second swing support points.

As described above, each of the spherical bodies 320 of the movable frame 310 is swingably contacted with the contact point spring 330 and thus, the holder frame 220 of the movable body 20 is swingably supported by the cover frame 120 of the fixed body 10. Further, in the gimbal mechanism 30 structured as described above, urging forces of the respective contact point springs 330 are set to be equal to each other. In this embodiment, the magnetic drive mechanism is used in the shake correction drive mechanism 40 and thus both of the movable frame 310 and the contact point springs 330 used in the gimbal mechanism 30 are made of nonmagnetic material.

Further, in this embodiment, the movable frame 310 is disposed at the same height position as the coil holding parts 223 (same position in the "Z"-axis direction). Therefore, when viewed in a direction perpendicular to the optical axis "L" direction, the gimbal mechanism 30 is disposed at a position overlapping with the shake correction drive mechanism 40. Especially, in this embodiment, as shown in FIG. 9, when viewed in a direction perpendicular to the optical axis "L" direction, the gimbal mechanism 30 is disposed at a position overlapping with the center position in the "Z"-axis direction of the shake correction drive mechanism 40. More specifically, in a non-excitation state of the shake correction drive mechanism 40, the gimbal mechanism 30 is provided at the same height position as the magnetized polarizing lines 413 of the magnets 41 in the "Z"-axis direction. Therefore, the first swing support points and the second swing support points of the gimbal mechanism 30 are disposed at a position overlapping with the center position of the shake correction drive mechanism 40 in the "Z"-axis direction, and the swing center position 35 of the movable body 20 is also disposed at a position overlapping with the center position of the shake correction drive mechanism 40.

(Swing Allowable Range and Restriction Mechanism of Moving Range in Optical Axis Direction)

As described above, in the optical unit 101 in this embodiment, the movable body 20 is capable of swinging with the swing support point 35 as a center and, since the movable frame 310 of the gimbal mechanism 30 is formed of elastic material, the movable body 20 is also movable in the optical axis direction in an elastically deformable region. Further, a mechanism for restricting an allowable range of the swing or the movement in the optical axis direction of the movable body 20 is provided.

Specifically, in each of the coil holding parts 223 of the holder frame 220 of the movable body 20, the support plate part 224 is formed in a size protruding to one side "+Z" in the "Z"-axis direction with respect to the coil 42 in a state that the coil 42 is mounted on the support plate part 224. The protruding end part is formed along an extending direction of the support plate part 224, and corner parts 224*a* and 224*b* at both ends of the protruding end part are structured so as to be abutted with a surface 122*a* of the protruded part 122 of the cover frame 120 at a maximum position in the swing allowable range. In this case, since the four support plate parts 224 are provided, in a plan view when viewed from the "+Z" side in the "Z"-axis direction, totaled eight corner parts 224*a* and 224*b* are disposed, i.e., four on the right and left sides across the first axial line "R1" and four on the right and left sides across the second axial line "R2". Positions in the "Z"-axis direction of the respective corner parts 224*a* and 224*b* are set to be equal to each other.

Further, two of the four support plate parts 224 are connected with each other by the connecting part 227 and the four support plate parts 224 are formed in an arrangement of 45° with respect to the first axial line "R1" which is the direction where both the connecting parts 227 are connected and with respect to the second axial line "R2" which is the direction perpendicular to the first axial line "R1". Therefore, as shown in FIG. 5, in the four corner parts 224*a* and 224*b* which are disposed on each of the right side and the left side across the first axial line "R1", when two corner parts disposed at positions farther from the first axial line "R1" are indicated by the reference sign 224*a* and two corner parts disposed at positions farther from the second axial line "R2" are indicated by the reference sign 224*b*, distances from the first axial line "R1" of the two corner parts 224*a* disposed at the positions farther from the first axial line "R1" are set to be equal to each other, and distances from the second axial line "R2" of the two corner parts 224*b* disposed at positions farther from the second axial line "R2" are set to be equal to each other.

Further, at a maximum position of the swing allowable range, the two corner parts 224*a* disposed at positions farther from the first axial line "R1" are abutted with the surface 122*a* of the protruded part 122 of the cover frame 120 for a swing around the first axial line "R1", and the two corner parts 224*b* disposed at positions farther from the second axial line "R2" are abutted with the surface 122*a* of the protruded part 122 of the cover frame 120 for a swing around the second axial line "R2".

In other words, the corner parts 224*a* and 224*b* of the support plate part 224 are abutted with the surface 122*a* of the protruded part 122 of the cover frame 120 (face 122*a* on the other "−Z" side in the "Z"-axis direction) in a maximum swing range to restrict a further swing. In other words, eight corner parts 224*a* and 224*b* of the four support plate parts 224 are a first abutting part in at least an embodiment of the present invention, the surface 122*a* of the protruded part 122 of the cover frame 120 is a first stopper part in at least an embodiment of the present invention, and a swing allowable range restriction mechanism is structured of the first abutting part and the first stopper part.

On the other hand, the gravity center adjustment member 230 in a ring shape is provided at an upper end part of the holder holding part 221 of the holder frame 220 (end part on one side "+Z" in the "Z"-axis direction). A longitudinal cross section along the "Z"-axis direction of the gravity center adjustment member 230 is, as shown in FIG. 9, formed in a pentagonal shape, and an inclined face 231 is formed on one side "+Z" in the "Z"-axis direction so that the thickness in the "Z"-axis direction is gradually reduced as going to an outer side in the radial direction, in other words, so that the inclined face 231 is inclined in a direction coming close to the optical axis "L" as going to an object side along the optical axis direction. Further, an inner peripheral part of the cover frame 120 of the fixed body 10 is projected to an inner side in the radial direction with respect to an outer peripheral face of the gravity center adjustment member 230. An inclined face 125 is formed on a rear face side of the inner peripheral part, in other words, on the other side "−Z" in the "Z"-axis direction so that a thickness in the "Z"-axis direction becomes gradually larger as going to an outer side in the radial direction (so that the inclined face 125 is inclined in a direction coming close to the optical axis "L" as going to an object side along the optical axis direction). Further, the inclined face 231 of the gravity center adjustment member 230 and the inclined face 125 of the cover frame 120 are faced each other and a gap space having a constant width is formed between the inclined face 231 and the inclined face 125. Further, when the movable body 20 including the gravity center adjustment member 230 is moved to one side "+Z" in the "Z"-axis direction (optical axis direction) by an external force, the inclined face 231 of the gravity center adjustment member 230 is abutted with the inclined face 125 of the cover frame 120 to restrict further movement. In other words, the inclined face 231 of the gravity center adjustment member 230 corresponds to a second abutting part in at least an embodiment of the present invention, the inclined face 125 of the cover frame 120 corresponds to a second stopper part in at least an embodiment of the present invention, and an optical axis direction movement restriction mechanism for the movable body 20 is structured by the inclined faces 231 and 125.

In this case, a separated distance "H1" in the "Z"-axis direction (optical axis direction) of a gap space between the inclined face 125 of the cover frame 120 and the inclined face 231 of the gravity center adjustment member 230 is set to be smaller than a separated distance "H2" in the "Z"-axis direction (optical axis direction) between the corner parts 224*a* and 224*b* of the support plate part 224 of the holder frame 220 described above and the protruded part 122 of the cover frame 120. Therefore, when the movable body 20 is going to be moved in the "Z"-axis direction by a predetermined amount or more, the inclined face 125 of the cover frame 120 and the inclined face 231 of the gravity center adjustment member 230 are abutted with each other without making the corner parts 224*a* and 224*b* of the support plate part 224 of the holder frame 220 abut with the protruded part 122 of the cover frame 120.

Further, the inclined face 125 of the cover frame 120 and the inclined face 231 of the gravity center adjustment member 230 are formed in inclined shapes substantially along a tangential direction at the time of swinging and, in addition, the separated distance "H1", sizes of opposing faces of both the inclined faces 125 and 231 and the like are set so as not to obstruct a swing of the movable body 20 and, even at the maximum position in the swing allowable range of the movable body 20, their dimensions are set so that both the inclined faces 231 and 125 are not contacted with each other.

In this embodiment, on the other side "−Z" in the "Z"-axis direction of the holder frame 220, as shown in FIG. 9, a spacer member 140 is provided which is located on a lower side with respect to the base part 215 of the lens holder 213

(the other side "−Z" in the "Z"-axis direction) and, after the flexible circuit boards 71 and 72 are fixed to the spacer member 140, the flexible circuit boards 71 and 72 are extended to the outside.

(Operations and Effects)

In the optical unit with a shake correction function 101 structured as described above, for pitching and yawing, the movable body 20 is swung around the first axial line "R1" or the second axial line "R2" by the gimbal mechanism (swing support mechanism) 30 and the shake correction drive mechanism 40 and a shake can be corrected. In correct control for the shake, the movable body 20 is swung as shown by the arrow in (b) of FIG. 11 and, when one of the corner parts (first abutting part) 224a and 224b of the support plate parts 224 of the holder frame 220 is abutted with the surface (first stopper part) 122a of the protruded part 122 of the cover frame 120, the further swing is restricted. An angle "θ" when the corner part 224a or the corner part 224b of the support plate part 224 is abutted with the protruded part 122 of the cover frame 120 is, for example, set at 10°, and the swing range is restricted in the angular range.

In this case, the gravity center adjustment member 230 is swung together with the holder frame 220. However, the inclined face 231 of its outer peripheral part and the inclined face 125 of the inner peripheral part of the cover frame 120 are not contacted with each other as described above and the swing is not obstructed. Further, the protruded part 226 of the holder frame 220 which faces the magnet 41 of the fixed body 10 is also provided so as to have a predetermined space between the magnet 41 and the protruded part 226, and the protruded part 226 is not contacted with the magnet 41 at the time of swinging.

Figure 12A:
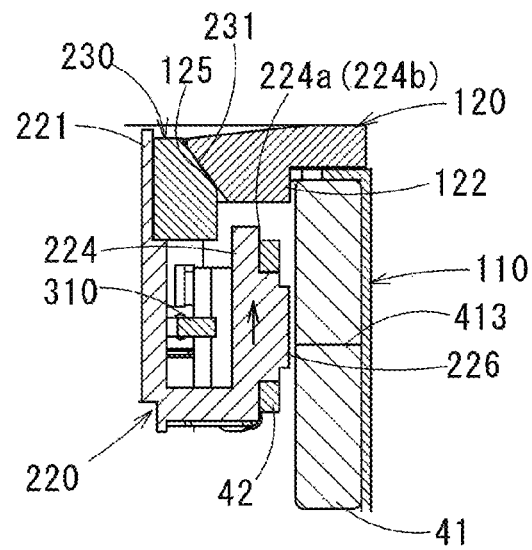
FIGS. 12A and 12B are enlarged cross-sectional views showing the part of the optical unit with a shake correction function in FIG. 11.

On the other hand, in a case that the movable body 20 is moved in the optical axis direction due to a drop impact or the like, when the movable body 20 is moved as shown by the arrow in FIG. 12A and the inclined face (second abutting part) 231 of the gravity center adjustment member 230 is abutted with the inclined face (second stopper part) 125 of the inner peripheral part of the cover frame 120, further movement is restricted. In this case, the upper end (tip end on the "+Z" side in the "Z"-axis direction) having the corner parts 224a and 224b of the support plate part 224 of the holder frame 220 does not reach to the surface 122a of the protruded part 122 of the cover frame 120, and the upper end is set in a state that a gap space is existed between the surface of the protruded part 122 and the upper end.

Figure 12B:
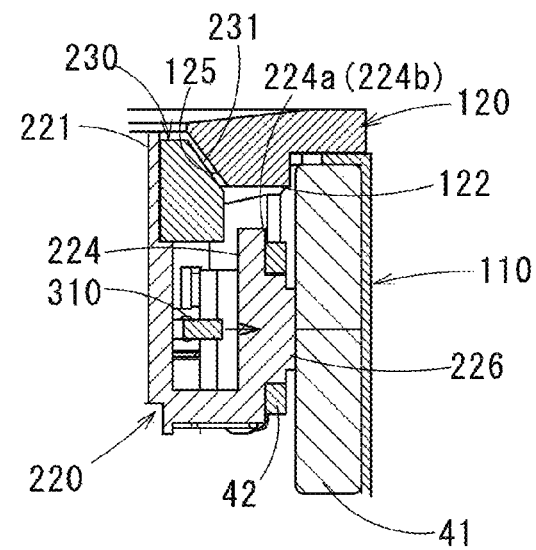

Further, in a case that the movable body 20 is moved in a direction perpendicular to the optical axis "L" due to a drop impact or the like, when the movable body 20 is moved as shown by the arrow in FIG. 12B and the protruded part 226 of the holder frame 220 is abutted with the magnet 41, further movement is restricted.

As described above, in the optical unit 101 with a shake correction function in this embodiment, a swing allowable range of the movable body 20 is restricted by the corner parts (first abutting part) 224a and 224b of the support plate part 224 of the holder frame 220 and the surface (first stopper part) 122a of the protruded part 122 of the cover frame 120 and, when an impact is applied due to dropping or the like, jumping-out in the optical axis direction of the movable body 20 is restricted by the inclined face (second abutting part) 231 of the gravity center adjustment member 230 and the inclined face (second stopper part) 125 of the cover frame 120, and a movement in the direction perpendicular to the optical axis "L" of the movable body 20 is restricted by the protruded part 226 of the holder frame 220 and the magnet 41. Therefore, excessive deformation of the movable frame 310 of the gimbal mechanism 30 and the like can be prevented and the durability is enhanced.

In this case, the distance "H1" in the optical axis direction between the inclined face (second abutting part) 231 of the gravity center adjustment member 230 and the inclined face (second stopper part) 125 of the cover frame 120 for restricting movement in the optical axis direction is set to be smaller than the separated distance "H2" in the optical axis direction between the corner parts (first abutting part) 224a and 224b of the support plate part 224 of the holder frame 220 and the protruded part 122 of the cover frame 120 for restricting the swing allowable range (in other words, the separated distance in the optical axis direction between the first abutting part and the fixed body). Therefore, in comparison with a case that the above-mentioned movement restriction mechanism in the optical axis direction is not provided, the entire dimension in the optical axis direction can be made small and the size of the optical unit 101 with a shake correction function can be reduced. In accordance with at least an embodiment of the present invention, it may be structured that a cushion sheet is stuck on the surface 122a and the inclined face 125 of the protruded part 122 of the cover frame 120 to absorb an impact at the time of collision of the movable body 20.

Further, in this embodiment, the inner peripheral part of the cover frame 120 is disposed so as to project and overlap on one side "+Z" in the "Z"-axis direction of the ring-shaped gravity center adjustment member 230 and the inclined faces 231 and 125 are formed between the cover frame 120 and the gravity center adjustment member 230. Therefore, when viewed from an object side in the optical axis direction, the inside is set in a concealed state and thus, a foreign matter such as dust is prevented from entering through a space between the inclined faces 231 and 125 and its design is also excellent.

In this embodiment, both the inclined faces 231 and 125 are formed in a conical face shape. However, both the inclined faces 231 and 125 may be formed in a circular arc face shape along a trace at the time of swinging of the movable body 20. In this case, the inclined face (second abutting part) 231 of the gravity center adjustment member 230 is formed in a convex circular arc face, and the inclined face (second stopper part) 125 of the cover frame 120 is formed in a concave circular arc face, and the convex circular arc face and the concave circular arc face are structured to be faced each other. In this case, the separated distance "H1" between the opposing faces of both the inclined faces (circular arc faces) can be further reduced.

Second Embodiment

Figure 11:
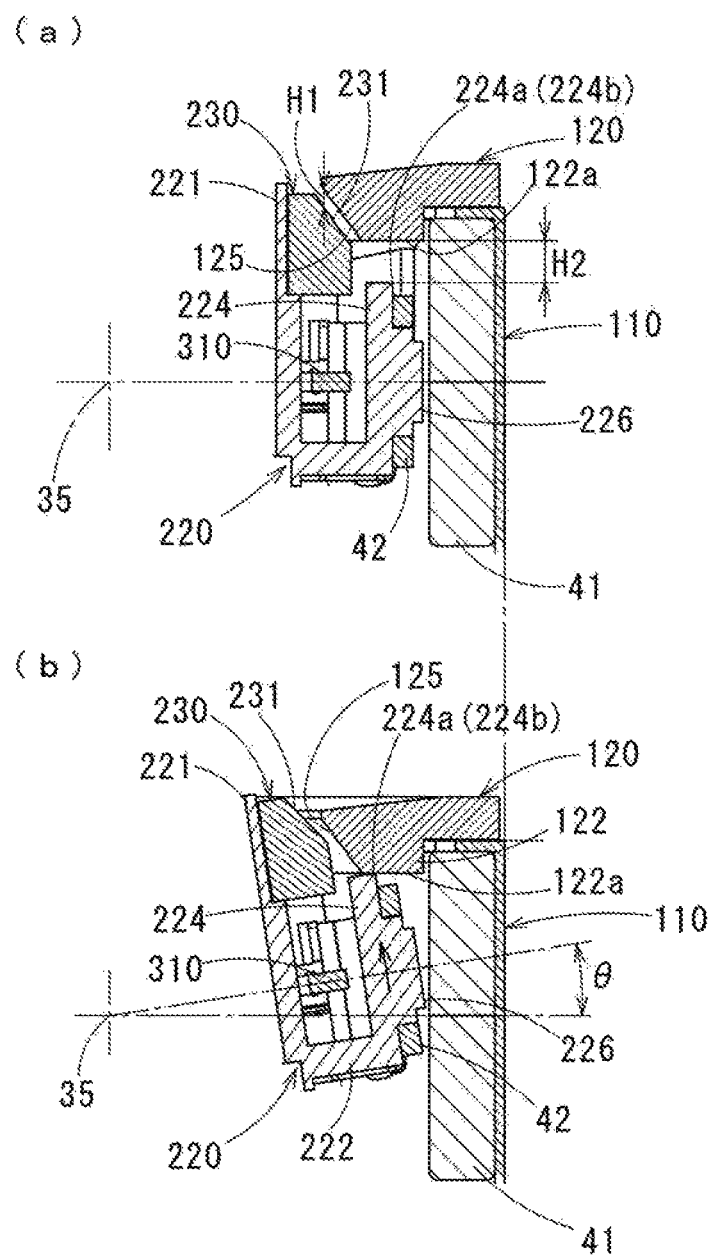
FIG. 11 are enlarged cross-sectional views showing a part of the optical unit with a shake correction function in FIG. 9, wherein (a) of FIG. 11 shows a non-excitation state, and (b) of FIG. 11 shows a state at a time of a maximum swing of a movable body.
Figure 13:
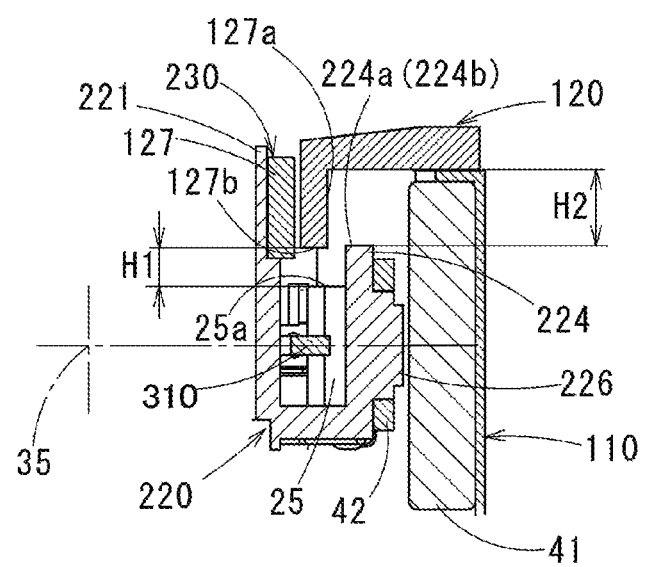
FIG. 13 is a cross-sectional view showing a part of an optical unit with a shake correction function in accordance with a second embodiment of the present invention which is a state similar to (a) of FIG. 11.
Figure 14A:
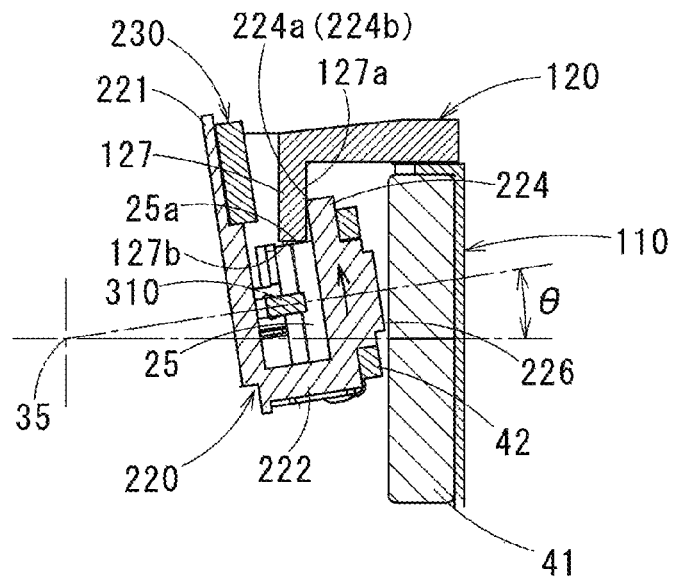
FIGS. 14A and 14B are enlarged cross-sectional views showing the part of the optical unit with a shake correction function in FIG. 13.
Figure 14B:
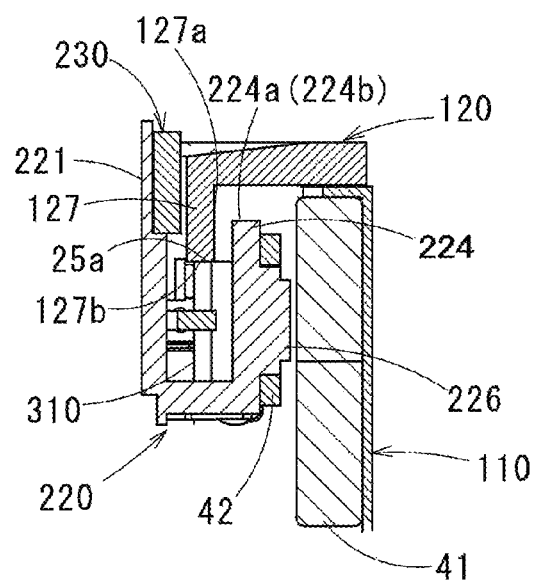

FIG. 13 and FIGS. 14A and 14B are cross-sectional views similar to (a) and (b) of FIG. 11 and FIG. 12A in an optical unit with a shake correction function in accordance with a second embodiment of the present invention. In the second embodiment, the same reference signs are used in elements common to the first embodiment to simplify their descriptions.

In the first embodiment, the first abutting part is structured of the corner parts 224a and 224b of the support plate part 224 of the holder frame 220, and the first stopper part is structured of the surface 122a of the protruded part 122 of the cover frame 120 (face facing the other side "−Z" in the "Z"-axis direction). However, in the second embodiment, the first abutting part is structured of the corner parts 224a and 224b similarly to the first embodiment, and a tube-shaped wall 127 is integrally provided toward the other side "−Z" in the "Z"-axis direction in an inner peripheral part of the cover frame 120, and the first stopper part is structured by an outer peripheral face 127*a* of the tube-shaped wall 127.

In a case that the first abutting part and the first stopper part are abutted with each other at a point, strictly speaking, in the first embodiment, an apex on the coil 42 side of the corner parts 224*a* and 224*b* of the support plate part 224 as the first abutting part is abutted with the first stopper part and, in the second embodiment, an apex on an opposite side to the coil 42 side of the support plate part 224 is abutted with the first stopper part. In a case that a cushion sheet is stuck on the first stopper part, the cushion sheet is elastically deformed at a time of collision and thus, it is assumed that a wide portion of the corner parts 224*a* and 224*b* from the coil 42 side to the opposite side is abutted with the first stopper part. Therefore, in this specification, the first abutting part includes the coil 42 side of the corner parts 224*a* and 224*b* and the opposite side to the coil 42 side of the corner parts 224*a* and 224*b*.

Further, an auxiliary wall part 25 whose height in the "Z"-axis direction is lower than the support plate part 224 is provided on an opposite side to a coil 42 side surface of the support plate part 224 of the holder frame 220 (reference sign is also indicated in FIG. 8). An upper end 25*a* of the auxiliary wall part 25 is structured as the second abutting part, and a lower end face (end face on the other side "−Z" in the "Z"-axis direction) 127*b* of the tube-shaped wall 127 of the cover frame 120 is structured as the second stopper part.

In the second embodiment, a longitudinal cross section of the gravity center adjustment member 230 is formed in a rectangular shape.

Also in the second embodiment, a separated distance "H1" in the optical axis direction ("Z"-axis direction) between the second abutting part 25*a* and the second stopper part 127*b* in a non-excitation state is set to be smaller than a separated distance "H2" in the optical axis direction ("Z"-axis direction) between the first abutting parts 224*a* and 224*b* and the cover frame 120.

Further, in the above-mentioned first embodiment, the first stopper part is formed in a flat face perpendicular to the "Z"-axis direction (surface 122*a* of the protruded part 122 of the cover frame 120) and thus, when the first abutting parts 224*a* and 224*b* are abutted with the first stopper part 122*a*, movement to the "+Z" side in the "Z"-axis direction of the first abutting parts 224*a* and 224*b* is also restricted. On the other hand, in the second embodiment, the first stopper part is the outer peripheral face 127*a* of the tube-shaped wall 127 of the cover frame 120 and is formed along the "Z"-axis direction. Therefore, even at a maximum swing position where the first abutting parts 224*a* and 224*b* are abutted with the first stopper part 127*a*, the first abutting parts 224*a* and 224*b* are capable of moving in the "Z"-axis direction along the first stopper part 127*a*. However, at the maximum swing position, the second abutting part 25*a* and the second stopper part 127*b* are arranged to be overlapped with each other in the "Z"-axis direction (optical axis direction). Therefore, even when the movable body 20 is going to move in the "Z"-axis direction due to a drop impact or the like at the maximum swing position, the second abutting part 25*a* is abutted with the second stopper part 127*b* and the movement is restricted.

Modified Embodiment of Attachment of Gravity Center Adjustment Member

Figure 15:
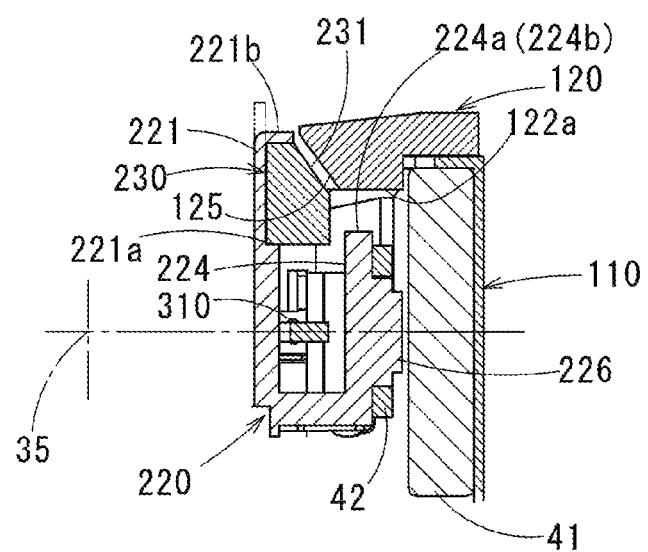
FIG. 15 is an enlarged cross-sectional view showing a modified embodiment of attaching a gravity center adjustment member, which is similar to the state in (a) of FIG. 11.

In the first embodiment, the gravity center adjustment member 230 is fixed to the outer peripheral part of the tube-shaped holder holding part 221 of the holder frame 220 by adhesion or the like. However, the holder frame 220 is formed of synthetic resin and thus, as shown in FIG. 15, it may be structured that an upper end of the holder holding part 221 is formed high as shown by the two-dot chain line and, after the gravity center adjustment member 230 is placed on the step part 221*a*, an upper end part 221*b* of the holder holding part 221 is pressed on an upper face of the gravity center adjustment member 230 while being thermally deformed and the gravity center adjustment member 230 is fixed between the thermally deformed upper end part 221*b* and the step part 221*a* by caulking.

Although the present invention has been shown and described with reference to a specific embodiment, various changes and modifications will be apparent to those skilled in the art from the teachings herein.

For example, the gimbal mechanism 30 is structured so that the spherical body 320 fixed to the movable frame 310 is contacted with the contact point spring 330. However, a spherical body is not necessarily required to be used. It may be structured that a spherical-shaped tip end face which is a tip end face of a bar-shaped member formed in a spherical shape is contacted with a contact point spring.

Further, in the embodiments described above, the optical unit with a function correcting pitching and yawing has been described. However, the optical unit may be structured to have a function correcting rolling in addition to pitching and yawing.

In addition, in the embodiments described above, a mechanism which swingably supports the movable body 20 with respect to the fixed body 10 is structured of the gimbal mechanism 30. However, a support mechanism may be structured so that a pivot shaft formed in a direction along the substantially optical axis "L" is used and, in this case, a tip end face of the pivot shaft is formed in a spherical-shaped tip end face, and the pivot shaft is swung in a direction intersecting the optical axis "L" with the spherical-shaped tip end face as a center.

Further, in the embodiments described above, the magnet 41 of the shake correction drive mechanism 40 is provided on the case 110 of the fixed body 10, and the coil 42 is provided on the holder frame 220 of the movable body 20. However, it may be structured that the magnet 41 is provided on the holder frame 220 of the movable body 20 and the coil 42 is provided on the case 110 of the fixed body 10. In this case, the holder frame 220 is provided with a magnet holding part instead of the coil holding part. In at least an embodiment of the present invention, the coil holding part and the magnet holding part are collectively referred to as the holding member.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function, comprising:
   a fixed body;
   a movable body, having an optical element;

a swing support mechanism, structured to swingably support the movable body with respect to the fixed body with a swing support point as a center; and a shake correction drive mechanism, structured to swing the movable body;

wherein the movable body comprises:

a first abutting part which is abutted with a first stopper part of the fixed body at a time of a maximum swing; and a second abutting part which is abutted with a second stopper part of the fixed body at a time of a movement in a direction of an optical axis of the optical element;

wherein the second abutting part comprises a second abutting part inclined face and the second stopper part comprises a second stopper part inclined face, each of which is inclined in a direction approaching the optical axis as going to an object side;

wherein each of the second abutting part inclined face and the second stopper part inclined face is formed in an inclined shape substantially along a tangential direction at a time of swinging of the movable body with the swing support point as a center;

wherein the second stopper part inclined face and the second abutting part inclined face are separated from each other so as not to contact with each other when the movable body is swung; and wherein a separated distance along the direction of the optical axis between the second stopper part inclined face and the second abutting part inclined face when the movable body is not swung is set to be smaller than a separated distance along the direction of the optical axis between the first abutting part and the fixed body when the movable body is not swung.

2. The optical unit with a shake correction function according to claim 1, wherein each of the second abutting part inclined face and the second stopper part inclined face is formed in a circular arc face with the swing support point of the movable body as a center.

3. The optical unit with a shake correction function according to claim 1, wherein each of the second abutting part and the second stopper part is formed in a ring shape along a circumferential direction around the optical axis.

4. The optical unit with a shake correction function according to claim 3, wherein the second abutting part and the second stopper part are disposed so that at least parts of the second abutting part and the second stopper part are overlapped with each other in the direction of the optical axis at a time of a maximum swing by the shake correction drive mechanism.

5. The optical unit with a shake correction function according to claim 1, wherein the movable body comprises:

an optical module, having the optical element; and a gravity center adjustment member which is provided in the optical module on an object side in the direction of the optical axis for adjusting a gravity center position of the movable body in the direction of the optical axis; and the second abutting part is provided in the gravity center adjustment member.

6. The optical unit with a shake correction function according to claim 1, wherein the shake correction drive mechanism comprises a magnet and a coil, one of the magnet and the coil is provided in the fixed body, and an other is provided in the movable body, and the first abutting part is provided in a holding member which holds the other of the magnet and the coil in the movable body.

7. The optical unit with a shake correction function according to claim 1, wherein the second abutting part and the second stopper part are disposed so that at least parts of the second abutting part and the second stopper part are overlapped with each other in the direction of the optical axis at a time of a maximum swing by the shake correction drive mechanism.

* * * * *